United States Patent [19]

Rosen et al.

[11] Patent Number: 5,020,105

[45] Date of Patent: * May 28, 1991

[54] FIELD INITIALIZED AUTHENTICATION SYSTEM FOR PROTECTIVE SECURITY OF ELECTRONIC INFORMATION NETWORKS

[75] Inventors: Richard D. Rosen; Robert B. McCown; Matthew S. Fleming, all of Columbus, Ohio

[73] Assignee: Applied Information Technologies Corporation, Columbus, Ohio

[*] Notice: The portion of the term of this patent subsequent to Mar. 15, 2005 has been disclaimed.

[21] Appl. No.: 395,291

[22] Filed: Aug. 17, 1989

Related U.S. Application Data

[63] Continuation of Ser. No. 266,257, Nov. 1, 1988, abandoned, which is a continuation of Ser. No. 140,580, Jan. 4, 1988, abandoned, which is a continuation of Ser. No. 874,381, Jun. 16, 1986, Pat. No. 4,731,841.

[51] Int. Cl.$^5$ ............................................. H04L 9/00
[52] U.S. Cl. ........................................ 380/23; 380/28; 380/30; 380/49
[58] Field of Search .................................. 380/23–25, 380/28, 30, 44

[56] References Cited

U.S. PATENT DOCUMENTS

| | | | |
|---|---|---|---|
| 4,193,131 | 3/1980 | Lennon et al. | 380/25 |
| 4,200,770 | 4/1980 | Hellman et al. | 380/30 |
| 4,351,982 | 9/1982 | Miller et al. | 380/30 |
| 4,405,829 | 9/1983 | Rivest et al. | 380/30 |
| 4,438,824 | 3/1984 | Mueller-Schlarer | 380/24 |
| 4,453,074 | 6/1984 | Weinstein | 380/30 |
| 4,458,109 | 7/1984 | Mueller-Schlorer | 380/30 |
| 4,467,139 | 8/1984 | Mollier | 380/23 |
| 4,549,075 | 10/1985 | Saada et al. | 380/23 |
| 4,731,841 | 3/1988 | Rosen et al. | 380/23 |
| 4,736,423 | 4/1988 | Matyas | 380/30 |

Primary Examiner—Thomas H. Tarcza
Assistant Examiner—David Cain
Attorney, Agent, or Firm—Frank H. Foster

[57] ABSTRACT

An authentication system for electronic information networks having small hand-held portable authenticating devices which are remotely initialized and can use 4 bit microprocessors in a challenge-response security system and yet permit practical communication of the large numbers which are necessary for sufficient security.

12 Claims, 8 Drawing Sheets

125 BIT PUBLIC KEY

CS-[(9-DIGIT 1)+DIGIT 2+(9-DIGIT 3)+DIGIT 4+(9-DIGIT 5)+ DIGIT 6] MOD 10

1

FIELD INITIALIZED AUTHENTICATION SYSTEM FOR PROTECTIVE SECURITY OF ELECTRONIC INFORMATION NETWORKS

This is a continuation application of pending prior application Ser. No. 07/266,257, filed on Nov. 1, 1988, which is a continuation of application Ser. No. 07/140,580, filed Jan. 4, 1988, now abandoned, which was a continuation of application Ser. No. 06/874,381, filed June 16, 1986, now U.S. Pat. No. 4,731,841, issued Mar. 15, 1988.

TECHNICAL FIELD

This invention relates generally to security systems for authenticating the authority of a remote user, who is seeking access to an electronic information network, to have access to that network and more particularly the invention relates to a challenge-response system in which each authorized remote user has a portable authenticating device which can implement a security procedure. The authenticating devices can all be mass produced with the identical construction and identical initial programming and subsequently initialized from remote terminals by each remote user in communication with the electronic information network.

BACKGROUND ART

Since the advances in computer technology have made the electronic computer and associated information networks highly efficient tools for business, government and home, the problem of unauthorized access to a host computer has been widely recognized along with the resulting problems of altered accounts and fraudulent transactions. As public access to host computers has become easier through public communication networks, the problems have increased. As greater use is made of information networks, the problem becomes more important.

To combat these problems, the conventional and traditional use of passwords provides a first level of security. In such a security system, a password is stored in the host computer sometimes in association with an identity designation for a remote user, such as the user's name. The user, sometimes after communicating his or her identity designation to the host computer, is challenged to provide the appropriate password. Communication of the correct password from the remote user to the host computer initiates access to the host computer.

The problem with password security is that its effectiveness is minimal because passwords can easily be stolen by others by electronic or visual eavesdropping, or in some cases, by reading a record of the communications between the remote user and the host computer. Further, the fact that a password has been "stolen" is not apparent to the legitimate, authorized users because a password is not a physical item, but rather a piece of "knowledge" that can easily be replicated by unauthorized system users.

Additional security has been sought by the implementation of extensive log-on procedures in some electronic information systems. These procedures must be known to the user and followed in logging onto the system or else access is denied. For limited access computer systems, such as those confined to a single building or company, these procedures can be justified and users can be accordingly trained. However, such systems are generally unsatisfactory in systems with large numbers of users because they are necessarily complicated in order to be effective. Therefore, they could be expected to meet with customer resistance because such cumbersome log-on procedures are too difficult, time consuming and distracting for the ordinary computer user.

In an attempt to overcome these problems, some systems have been devised to read the biometric traits of the individual remote user, such as by detecting a voice print, fingerprint, signature or the frequency response characteristics for a portion of the human body. Such systems have the advantage that they are dependent upon physiological characteristics which are conveniently mobile with the remote user so that the user is not regional to remember any security passwords. Further, such systems are not complicated for the user and additionally, depend upon characteristics which are personal to the user and cannot be "stolen". The problem with such systems, however, is that the apparatus needed for detecting such biometric traits is expensive, needs special connection to the remote terminal, and is not conveniently portable.

Prior art workers have also devised small, portable, hand-held computers which are programmed to perform an authentication algorithm in response to alphanumeric data which is keyed into the device. The algorithm is a function of the particular code which is stored in each such portable device when it is manufactured. Such currently known prior art devices, however, must each be custom initialized at a centralized location. This can occur during the manufacturing process by the storage of a different code or number into each unit, or at the issuing site for the application.

The problem with such a system is not only the added cost of centralized initialization for each device but, more importantly, such a system provides a substantial opportunity for a breach of security during the initialization. In particular, such a system provides an opportunity for persons involved in the initialization process to eavesdrop and breach system security. It affords an opportunity for them to learn particular codes or numbers and, in conjunction with the authentication algorithm, they are then able to emulate the characteristics of any initialized device. Furthermore, such a system affords them the opportunity to surreptitiously initialize second or multiple devices with identical codes so that each would perform the algorithm in the identical manner as an authorized device. It could be used to simulate the actions and responses of an authorized remote user.

Still others have proposed authenticating devices which are directly coupled through special hardware at the remote terminal so that they may be interrogated by the host computer to which the remote user is seeking access. However, such a system is unsatisfactory because it requires the special coupling device at additional cost and complexity, and can only be installed at a single remote terminal. It therefore cannot easily support typical users of electronic information services who wish to be granted access to the network from a wide range of remote terminals at various geographical locations.

BRIEF DISCLOSURE OF INVENTION

The present invention utilizes a small, portable, hand-held authenticating device containing a computer and capable of key input, data display and performing various operations, including the performance of an authentication algorithm. The behavior of this algorithm is the function of a secret key stored within each device through a field initialization process. Each of the portable authenticating devices of the present invention are identically manufactured. The secret key, or code, is not embedded in the hand-held portable authenticator during the manufacturing process. Instead, all the authenticating devices are distributed to the remote users in the identical form. Each remote user subsequently establishes communication between a host computer and the remote user at a convenient remote terminal. During this initial communication, an initialization procedure is followed which generates and stores a uniquely derived secret key or code in the portable authentication device. The initialization process also contains a secure method for storing a copy of the uniquely derived secret key in the host computer, preferably in association with the password, or other identifying designation for the remote user.

This completely eliminates the previously described opportunity for breach of security during a centralized initialization process. It also reduces the cost of distribution of authenticating devices for large user populations because no labor cost is incurred by the authentication device issuing agency during the field initialization procedure. The unique secret key or code for each remote user is created in a manner such that a person having access to the entirety of the communications between the host computer and the remOte user during initializatiOn and also having complete access to the authentication algorithm and the entirety of the operation of the system would nevertheless be unable to determine the secret key within a practical length of time and therefore would be unable to obtain unauthorized access to the host computer.

A preferred embodiment of the present invention is able to perform the above characteristics using low-cost electronic hardware. The present invention can be installed into a portable device with complexity and cost no greater than the mass produced, credit card-sized calculator using 4-bit microprocessor technology. One advantage of a single chip microprocessor with no external addressing lines is the fact that the memory containing the secret key is not accessible to external probing. This enhances security of the device from tampering.

In order to obtain the high degree of security which is desired for the present invention and yet have a system in which is a four-bit processor can be used and which is relatively easy to use, alphanumeric codes or numbers having a large number of digits are communicated to and from the authentication device by breaking the numbers down into blocks or groups of numbers. These numbers are communicated to the remote user, input into the authentication device, output from the authentication device and communicated back to the host computer in these groups or blocks.

Accordingly, it is an object and feature of the present invention to provide an authentication device which is relatively small, portable and inexpensive, comparable, for example, to a credit card size portable calculator and which can be remotely initialized and then used to authenticate the authority of the person in possession of it to have access to the host computer.

Another object of the present invention is to provide such an authentication device which does not require any type of physical connection or coupling to a remote terminal or an electronic network and which does not require any complicated form of operation.

Another object and feature of the present invention is to provide such an authentication system which provides a greatly increased level of security and is able to be operated with the relatively large numbers which are required for such security and yet be acceptable by and easily operated in a mass market consumer environment.

Figure 1:
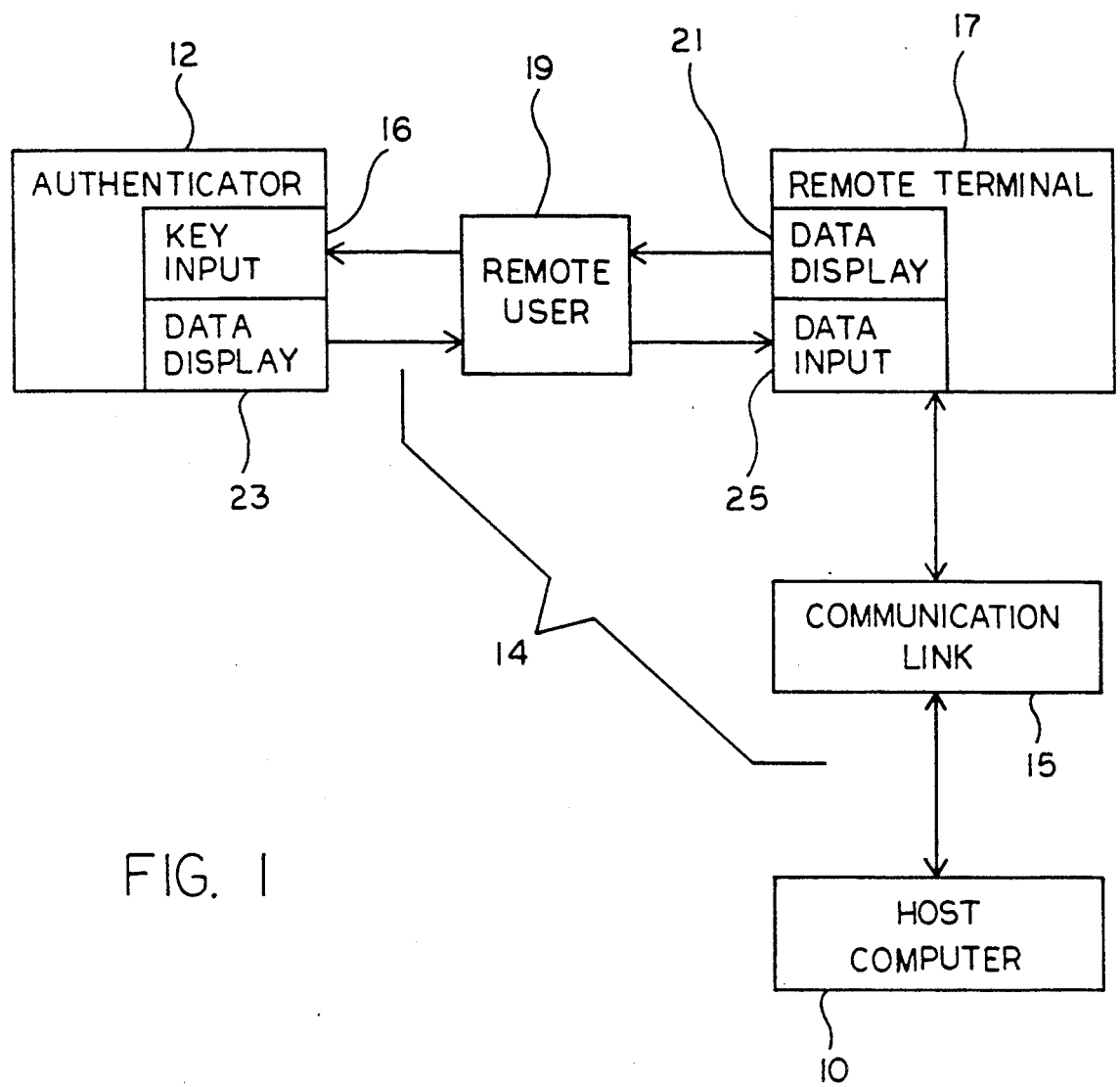
FIG. 1 is a simplified block diagram illustrating the basic components of the authenticating system embodying the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION OF HARDWARE

Figure 2:
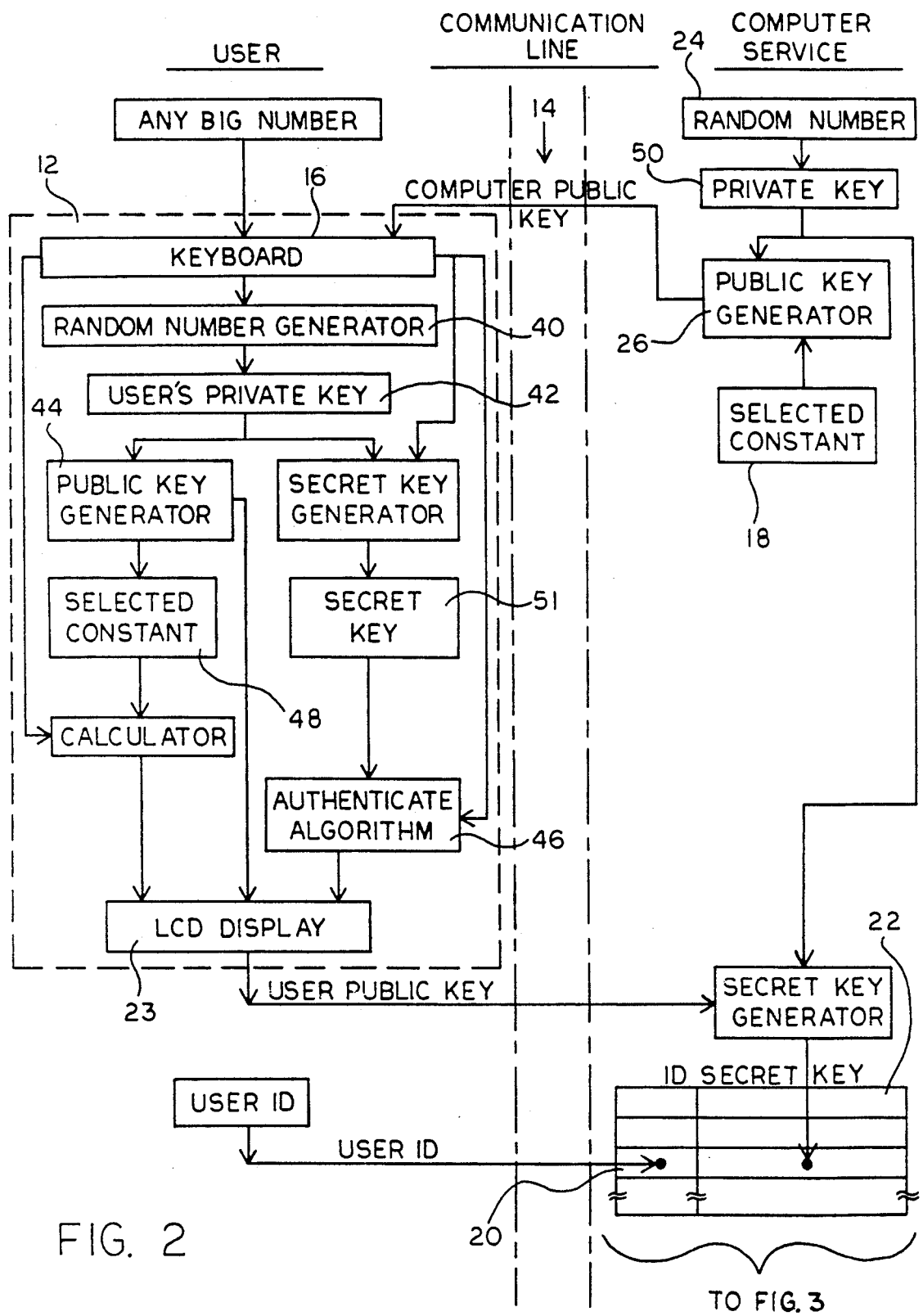
FIG. 2 is a block diagram illustrating a personal authenticating device embodying the present invention and the system for uniquely initializing the device and the host computer for each remote user.

Referring to FIGS. 1 and 2, the system of the present invention includes a host computer 10 and a portable, hand-held personal authenticating means 12 which are at times connected in communication through a communication means, indicated generally as 14. The communication means 14 might include, for example, a conventional public communication link 15 connected at one end to the host computer 10 and connected at the other end on line to a remote terminal 17 which is operated by the remote user 19. The remote terminal 17 is connected in communication with the authentication device 12 by means of the remote user 19 who observes data output at the remote terminal data display 21 or at the display 23 of the authentication means 12 and keys in data on the keyboard 16 of the authenticator device 12 and on the keyboard 25 of the conventional remote terminal.

Both the authenticating means 12 and the host computer 10 include conventional digital computers. Thus, they include the microprocessors, digital memory and input and output devices, all of which are very well known and therefore are not separately identified in the figures. Each includes all the memory which is necessary for performing the typical operations for which conventional, digital computers are capable of performing.

Figure 3:
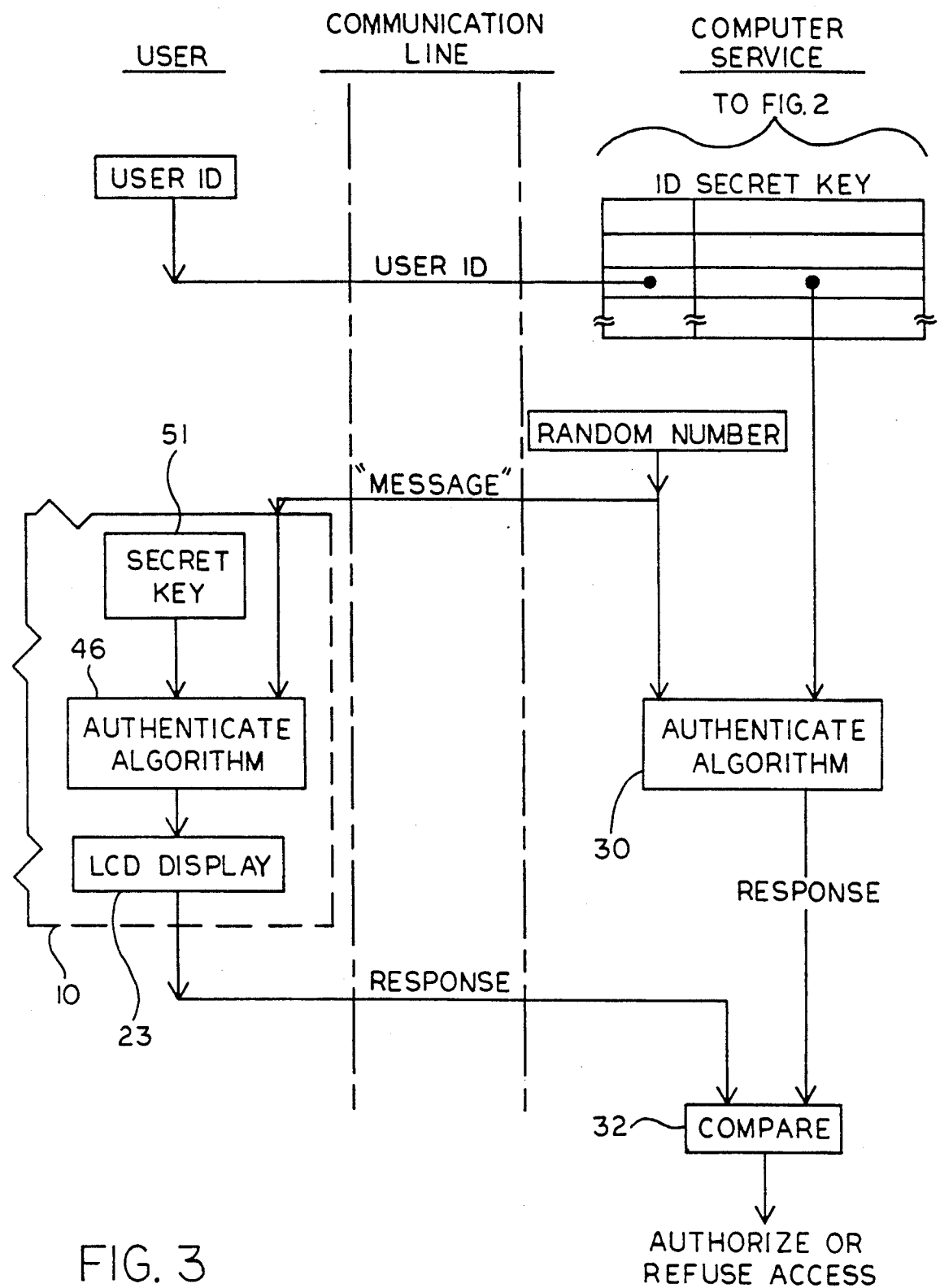
FIG. 3 is a block diagram illustrating the system of the present invention used for authenticating the authorization of the remote user to access the electronic information system.

The memory of the host computer includes, however, a data storage means 18 for storing a selected constant and a data storage means 20 for storing an identity designation in association with a secret key stored in a data storage means 22 in association with the identity designation. Additionally, the host computer includes means 24 for generating a random number in order to provide a private key and a means 26 for generating a public key by raising the selected constant stored in memory 18 to the power of the random number. The host computer 10 also includes (see FIG. 3) means for performing a noninvertible authentication algorithm 30 and means 32 for comparing the response or result of the performance of that authentication algorithm 30 to a response communicated from the remote user to the host computer and to authorize access to the host computer by the remote user when the responses are identical and to refuse access when they are not.

The authenticator 12 includes a conventional digital computing means including data storage means, a conventional key input means 16 for keying in data by the remote user 19 and a data display 23 at which outputs from the authenticating device 12 can be read by the remote user for communication to the host computer 10.

The authenticator device 12 also includes a means 40 for generating a random number as the user's private key 42, a means 44 for raising the selected constant to the power of the random number 42 and a means 46 for performing the identical, noninvertible authentication algorithm as is performed in the host computer. The storage means of the authenticator device 12 includes means 48 for storing the selected constant and means 50 for storing the secret key in the authenticator device 12. As will be apparent from the further description of the invention, the secret key must be stored in a nonvolatile memory device of the type currently commercially available after it has been generated during the initialization procedure.

Both the host computer and the authenticator device 12 are programmed for performing many of the operations described below in conventional modulo arithmetic. The identical modulus is, of course, stored in the conventional memory of each device. The program memory of each device further includes programming for breaking down and transmitting computed data groups between the host computer and the authentication device in groups of alphanumeric characters representing portions of the computed data. Since a person of ordinary skill in the programming art could prepare computer instructions for accomplishing this based upon this description, a particular program is not listed.

Figure 10:
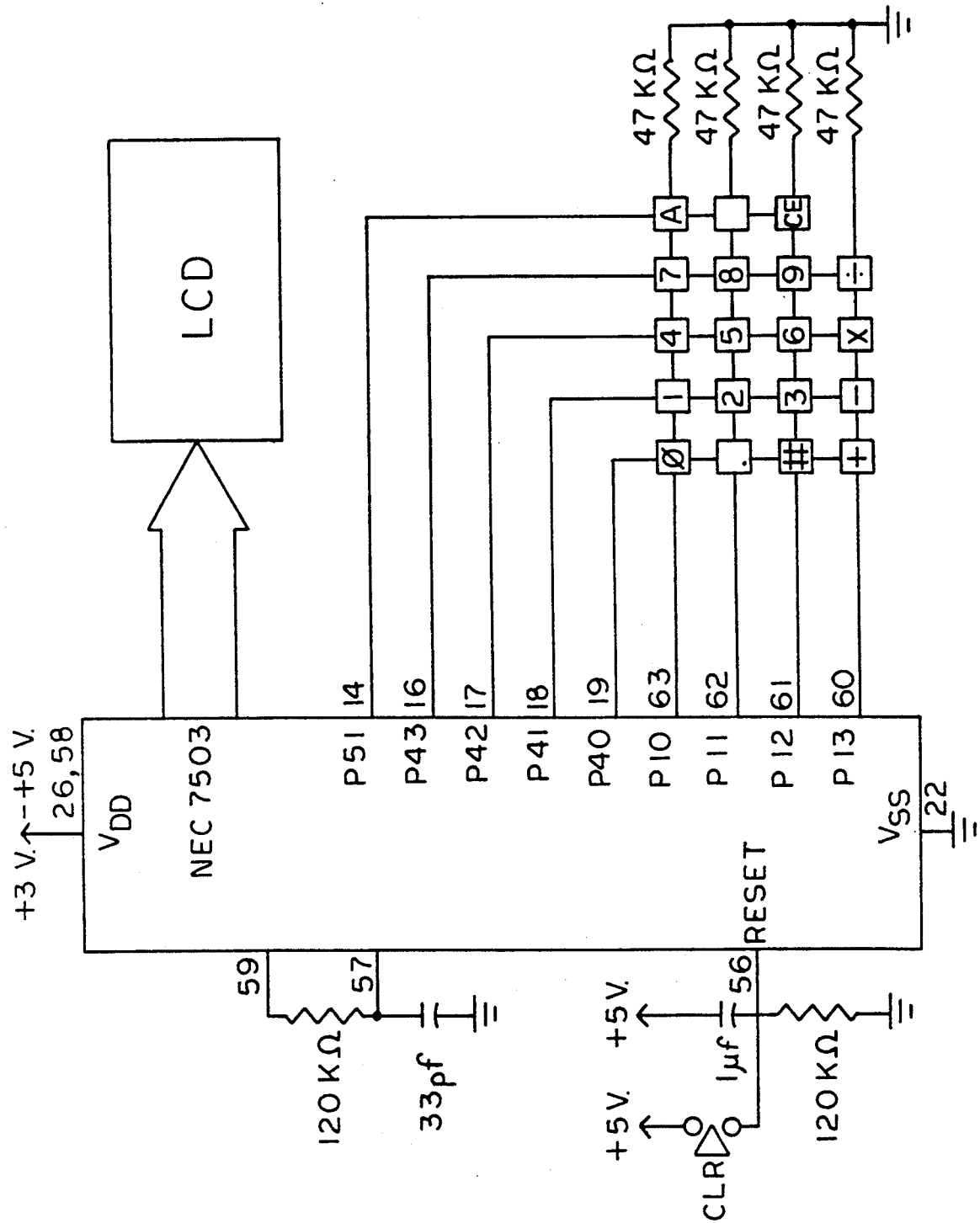
FIG. 10 is a schematic diagram of the circuitry of the personal authenticating device embodying the present invention.

The specific circuitry for the personal authenticator device is illustrated in FIG. 10 with the parts information given on the drawing.

One of the principal features of the present invention is that the system in accordance with the present invention utilizes a large number of authenticating computer means 12, each of which is distributed to an authorized remote user without first being uniquely, individually initialized. Thus, neither the manufacturing nor the distribution stage provides an opportunity for a breach of security and, furthermore, the need for the extra initialization steps during manufacture or distribution is entirely eliminated.

DETAILED DESCRIPTION OF METHOD OF OPERATIONS

When an electronic information network adopts the security system of the present invention, it stores in the host computer the same selected constant which is stored in all of the authentication devices and also stores the same modulus for performing mathematical operations in modulo arithmetic. It also stores in the host computer instructions for raising a number to a power, instructions for generating a random number and instructions for performing the same noninvertible authentication algorithm which can be performed by the authenticator 12, which will be the same function of a secret key yet to be generated and stored.

When a subscriber to the service of an electronic information network meets the qualifications for access to the host computer, an off-the-shelf authenticator 12 is distributed to him or her. Upon receipt of the authenticating device 16, the remote user first follows an initialization procedure in order to generate and store in the authenticator 12 and in the host computer 10 the identical secret key. The secret key is based on two large random numbers, one of which is generated in the authenticator and one of which is generated in the host computer. This is done using Hellman's method such that an eavesdropper possessing a complete record of all communications between the authentication device and the host computer cannot in a reasonable time calculate the secret key. Dr. Hellman's methods are discussed in U.S. Pat. Nos. 4,200,770 and 4,218,582. See also U.S. Pat. No. 4,309,569.

The initialization procedure is performed only once and preferably the authenticator is programmed so that it can only be initialized once. Each of the portable authentication devices is independently initialized with the host computer from a location which is remote from the host computer and which is selected by the remote user.

After initialization is reliably accomplished, the authenticator device is used to authenticate the authority of the remote user to access the host computer. Since the authentication algorithm is performed within the authenticator device 12 and in the host computer 10, it is unnecessary that the remote user know the authentication algorithm. More importantly, since the secret key is stored in the authenticator device 12 and in the host computer 10, it is never necessary for any human to know the secret key and desirably, the secret key is inaccessible to the operator of the authentication device 12.

The authentication system of the present invention does not validate a particular individual, but rather validates that the remote user who is seeking access to the information network or who has access to the network and seeks to continue access has possession of a personal authenticating device in accordance with the present invention. One advantage of this is that one authorized individual may deliver the authentication device to another whom he or she wishes to authorize for access to the electronic information network. This may be done easily and conveniently by mere physical delivery. A further advantage is that the receiving individual cannot duplicate it nor pass along information to another to enable the other to subsequently gain access to the network. Thus, its owner knows that when it is returned others could not have breached the security.

Authorization may be conveniently withdrawn by repossession of the authenticator.

Another advantage of the present invention is that, if the authentication device of the present invention is stolen, this breach of security will be readily apparent by the absence of the authentication device. The authorized possessor of it may then report its absence to the operators of the electronic information network who may then either withdraw access to anyone attempting to log on with it, or, in the alternative, may set traps for the unwary thief in order to apprehend him and bring him to justice.

Referring now in more detail to the initialization procedure, in order to initialize the authenticator, a subscribing remote user first establishes communication between the host computer and the remote user's authentication computer. The remote user then communicates a remote user identity designation, such as a conventional password or the remote user's name, from the remote user to the host computer which is stored in the host computer at memory means 20.

Random numbers are then generated independently in the host computer 10 and in the authenticator device 12 to be used as the private key of each computer. These random numbers are used to generate a public key in each computer The public keys are exchanged to generate the identical secret key in each computer using Hellman's method. Alternatively, the random number and public key of the remote user's authentication device may be generated before the communication is established. Conventional means may be used for generating a random number as is well known in the computer art.

In the preferred embodiment, the time to key any big number into the keyboard 16 of the authenticator computer 12 is used to generate its random number. In this method the elapsed time for the remote user to key in a multidigit number is detected using a modulo number system to count elapsed time and generate the private key for the authentication computer device 12. For example, the time for the remote user to key in the number 19467382 may be detected In the preferred embodiment a modulo system is used having as its modulus 2 raised to the power 125 to generate a truly random 125 bit private key which is not available for inspection at any display.

Other conventional random number generation techniques are used to generate a private key 50 in the host computer. Obviously, in essentially all cases, the random numbers which are the private keys of each will be different.

In the authenticator computer 12 the selected constant at storage means 48 is then raised to the power of the private key at 42 to generate the remote user's public key preferably as a 125 bit number using modulo arithmetic with the same modulus. This 125 bit public key is communicated to the host computer.

It would be extremely difficult and impractical to display a 125 bit number on the display of the personal authentication computer 12 and have it reliably communicated by the remote user to the host computer. It would require either an extremely large multidigit display or a complicated manner of displaying the number and communicating it to the host computer. Therefore, a method has been devised for breaking down the public key and transmitting it in separate alphanumeric portions to the host computer. The same method is used for communicating the public key of the host computer to the authentication computer 12.

Figure 4:
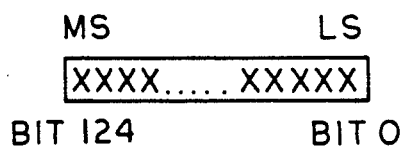
FIG. 4 is a diagram illustrating the system format for communicating the large multidigit alphanumeric codes or numbers in the form of public keys during the initialization of the system of the present invention.
Figure 4:
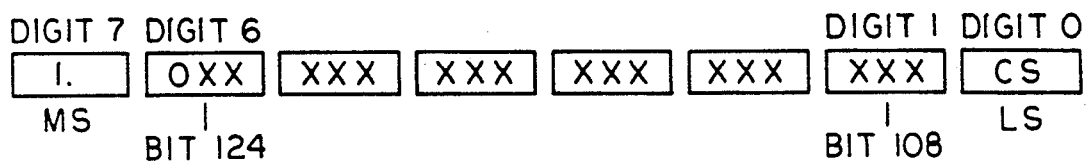
Figure 4:
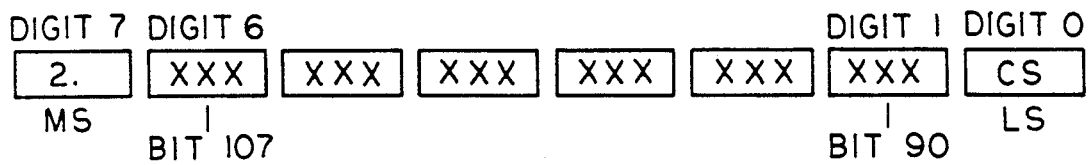
Figure 4:
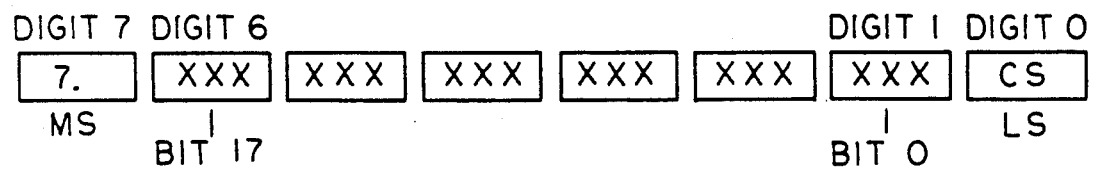

The 125 bit public key is broken into three binary digit groups, each group representing a binary coded digit in an octal number system capable of having values from 0 to 7. These binary coded octal digits are then grouped into blocks of 6 binary coded octal digits to form 7 blocks, each having 6 binary coded octal digits. Appended to each block of 6 octal digits as a most significant digit is a digit representing the block number. The block number will have a value of 1 to 7 to represent each of the 7 blocks. Appended to each block of 6 octal digits as the least significant digit is a conventional check sum formed as indicated in FIG. 4. Thus, each block consists of 8 digits which include the 6 binary coded octal digits as represented in FIG. 4. The authenticator computer 12 then displays on its data display 23 in sequence each of these 8 digit blocks. They are individually communicated by the remote user to the host computer, their check sums are checked by the host computer and if correct, are stored by the host computer. The blocks are communicated one at a time until all 7 blocks have been are communicated.

Similarly, the host computer after generating a private key 50 from its random number similarly raises the same selected constant to the power of its private key 50 in its public key generator 26 and communicates its public key to the remote user who keys it into the keyboard 16 in the same manner using similarly formatted blocks.

The accuracy of these public keys may be further verified by each computer retransmitting a block back to the sender and requesting that the sender compare the block to the corresponding block stored in its memory and signal whether they are identical.

The authenticator computer 12 of the remote user is then operated to raise its private key to the power of the public key of the host computer to generate the secret key 51 of the remote user's authenticator computer. Similarly, the host computer raises its private key 50 to the power of the public key from the remote user's authenticator computer to obtain the identical secret key. The host computer then stores this secret key in its memory in association with the identify designation of the remote user.

The communication may then be disconnected or a mock authentication sequence may then be performed to confirm that the identification has been correctly performed and then the communication may be disconnected.

The identical secret key is generated in both computers because whenever a number, such as the identical selected constant 18 stored in the host computer and the selected constant 48 stored in the authentication computer, is raised to the powers in accordance with the above method, the identical number results. In particular, if the selected constant is raised to a first power and the result is then raised to a second power the identical result is obtained as when the identical constant is raised to the second power and the result of that is then raised to the first power.

After the remote user authentication computer and the host computer have performed the initialization procedure, the remote user authentication computer 12 can then be subsequently used to authenticate the authority of the remote user to access the host computer. The authentication is performed by the remote user first seeking access to the host computer and communicating its identity designation to the host computer. The host computer uses the identity designation to find in its memory the secret key which was generated for that remote user.

A random number is generated in the host computer and communicated to the remote user. The authentication algorithm, which is a function of the secret key, then operates upon the random number in both the host computer and the remote user authenticating computer. The result of performing the algorithm in the remote user computer is then communicated to the host computer and compared with the result obtained in the host computer for performing the same algorithm. If the results are identical then the host computer permits access to its electronic information system and prevents access if they are not identical.

The authentication algorithm is a noninvertible algorithm. It is not a mathematical algorithm which can be expressed in mathematical symbols and in which an answer can be used to help determine the nature of the mathematical algorithm. In fact, the answer derived by a noninvertible algorithm could be an answer from an infinite number of different algorithms. The algorithm might be characterized in nonmathematical terms as a shell game with lots of shells and with numbers under all of the shells. The algorithm is simply a manner of shifting the numbers around and combining and operating upon them to derive a resulting number. The authentication algorithm of the preferred embodiment is illustrated in the figures and described. However, an infinite number of such noninvertible algorithms may be devised by those skilled in the art using any of an infinite variety of unique combinations of known scrambling, mapping and vectoring operations, such as those illustrated by the following description of the authentication algorithm used in the preferred embodiment. The authentication algorithm should look random and must be a function of the secret key and an input number, the challenge, which is randomly selected by the host computer and communicated to the remote user.

The preferred authentication algorithm is very difficult to break in terms of identifying the secret key by entering a series of random number trial messages in the authenticator computer and observing the resulting responses. Because less information is provided in the response than is contained in the input message or in the secret key, it is not possible to identify a mathematical relationship between the two. It would be necessary to key every possible input message and to record all responses in order to determine the authentication algorithm. This would require an impractical length of time. Furthermore, by programming the authentication computer to insert a time delay following its display of a response resulting from performing the authentication algorithm, for example a delay of 25 seconds, it would require approximately 250000000 seconds to identify all possible responses. Since one year has approximately 30000000 seconds it would require at least eight years to enter all possible inputs messages and record all possible responses.

Figure 5:
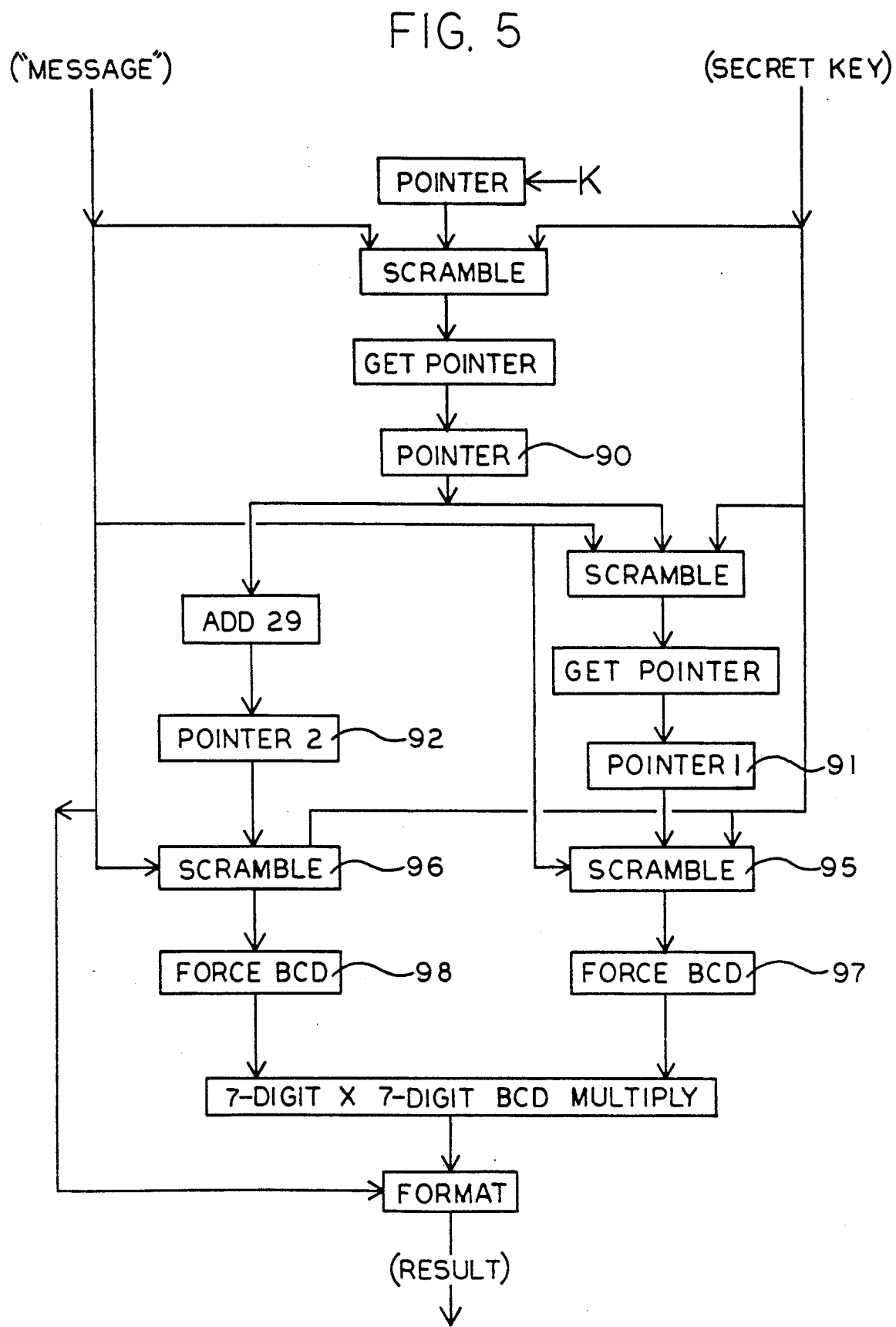
FIG. 5 is a block diagram illustrating the preferred authentication algorithm of the present invention.

A block diagram or flow chart of the preferred authentication algorithm is illustrated in FIG. 5. FIGS. 6-9 illustrate operations as subroutines which are performed at various places in the authentication algorithm. Since the algorithm is identical in both the host computer 10 and in the remote user authentication computer 12 it is only described once.

The host computer generates a random number which is referred to as the "message". This random number is communicated from the host computer to the authenticating computer so that both have access to both the secret key stored in their respective memories and the message so that both can perform the authentication algorithm. In the preferred embodiment the randomly generated "message" consists of a binary coded decimal having seven decimal digits.

Figure 6:
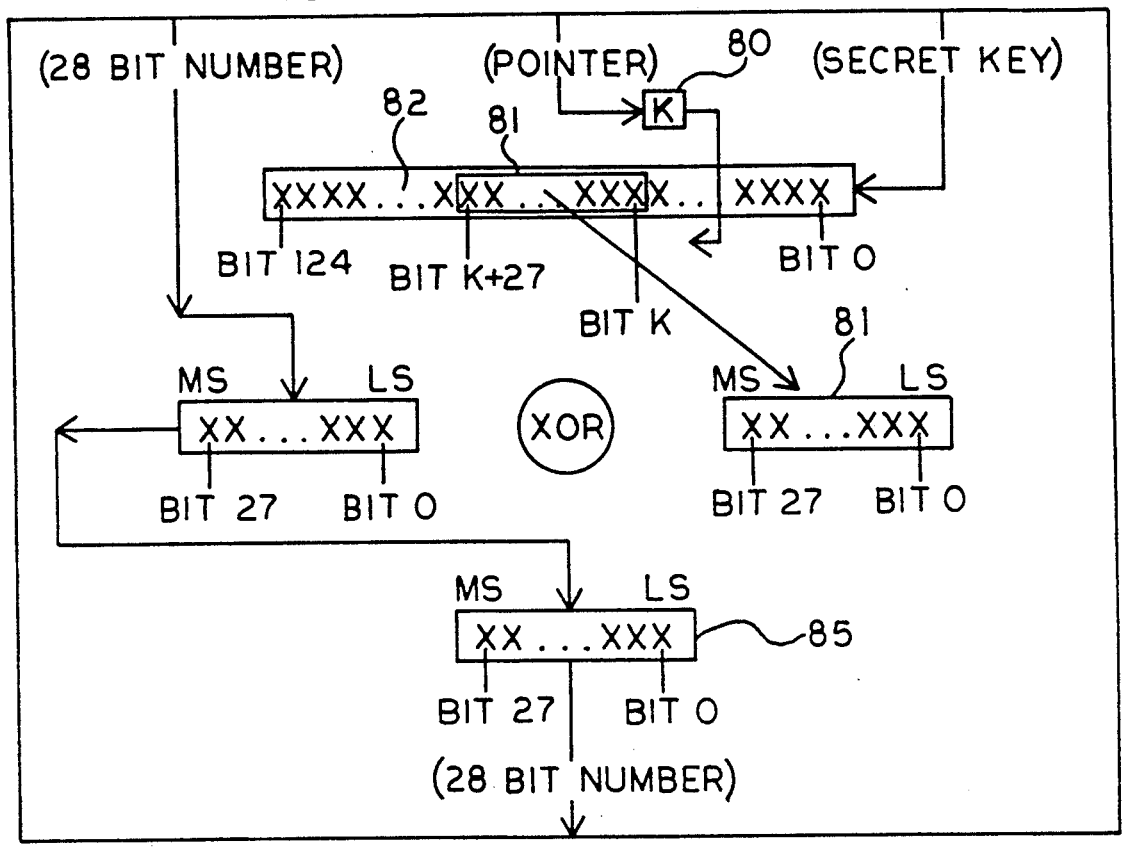
FIGS. 6–9 are block diagrams illustrating in more detail some of the operations illustrated in single blocks in FIG. 5.

Referring to FIG. 6, a pointer which is a constant stored as a part of the authentication algorithm, is retrieved from memory. The pointer 80 is utilized in the Scramble subroutine to select the 28 bits 81 of the 125 bit secret key 82 which will be exclusive ORed with the 28 bits which are the binary digits representing the message. The exclusive OR operation provides a resulting 28 bit number 85.

Figure 7:
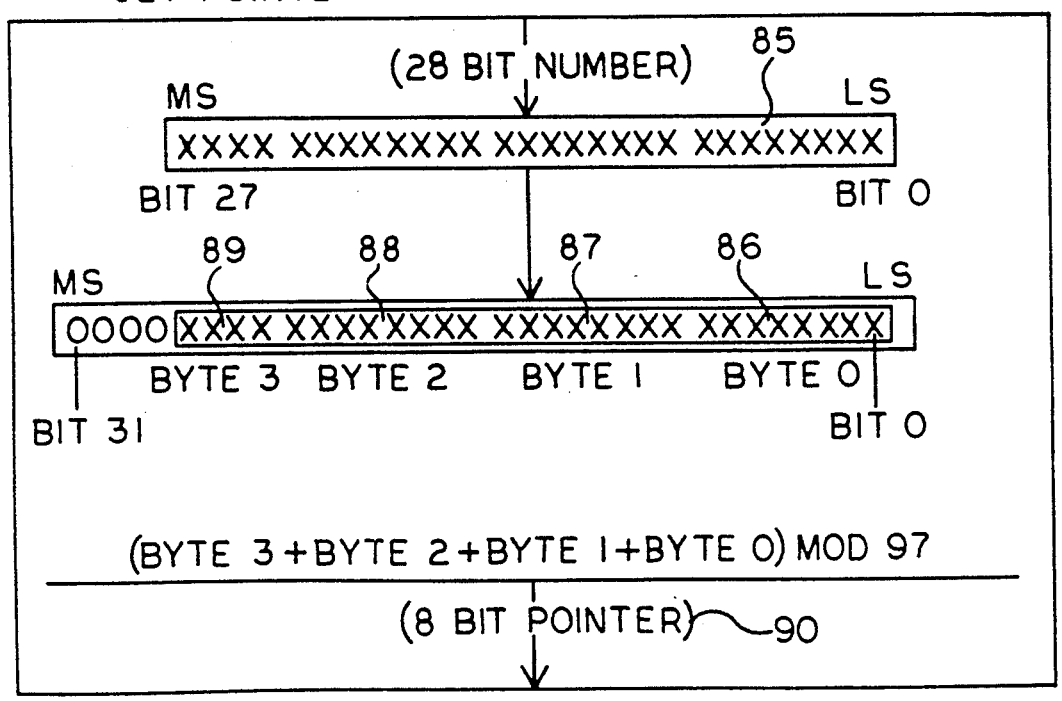

The Get Pointer subroutine, illustrated in FIG. 7, then breaks the resulting 28 bit number 85 into three 8 bit bytes 86, 87 and 88 and one 4 bit byte 89. These four bytes are then summed using modulo arithmetic and a modulus of 97 to calculate a binary 8 bit pointer 90. This result is a number between 0 and 96 which is used as a pointer into the bits of the secret key, the least significant bit of the secret key being the 0 vector.

The pointer 90 is then used to derive two other pointers, pointer 91 and pointer 92. The first pointer 91 is obtained by utilizing the same Scramble and Get Pointer subroutines operating upon the same message and secret key, but this time utilizing the pointer 90 to derive the first pointer 91. The second pointer is derived by adding the number 29 to pointer 90 to provide the second pointer 92. These two pointers, 91 and 92, are then applied to the Scramble subroutine, again using the secret key and the message, to derive two different 28 bit numbers from the respective use of the Scramble subroutines 95 and 96.

Figure 8:
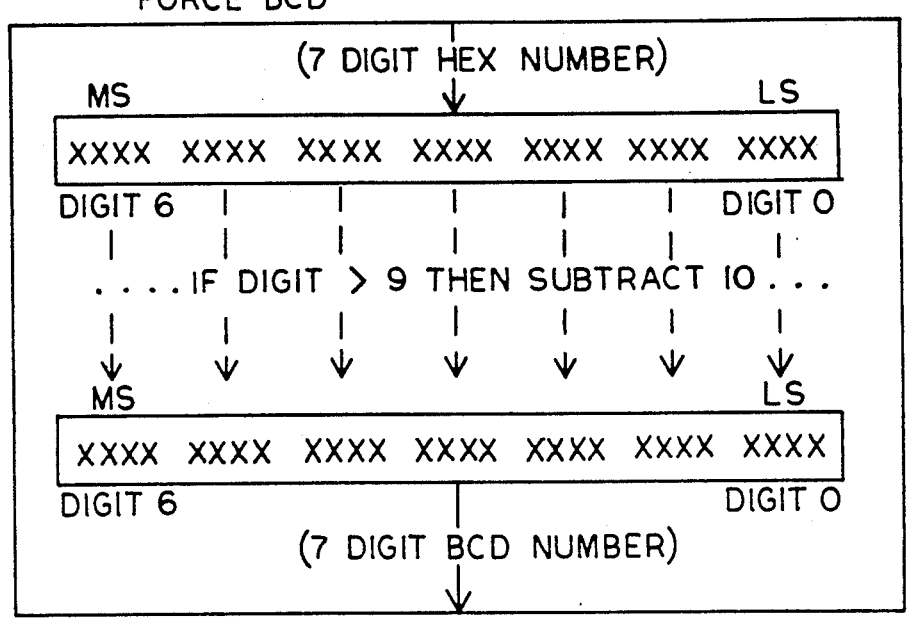

Each result of the Scramble subroutines 95 and 96 is applied to a Force BCD subroutine 97 and 98, illustrated in FIG. 8. The Force BCD subroutine decimal adjusts the 28 bit numbers without a carry. It does this by grouping the 28 bits into groups of 4, each group of 4 bits representing a hexadecimal digit to provide a 7 digit hexadecimal number. This is decimal adjusted by subtracting 10 from each hexadecimal digit which is greater than 9 to provide a resulting 7 digit binary coded decimal number, each digit being represented by the resulting 4 bits. The two 7 digit binary coded decimal numbers derived in this manner from the Force BCD subroutines 97 and 98 are then multiplied together, the product being a 14 digit number.

Figure 9:
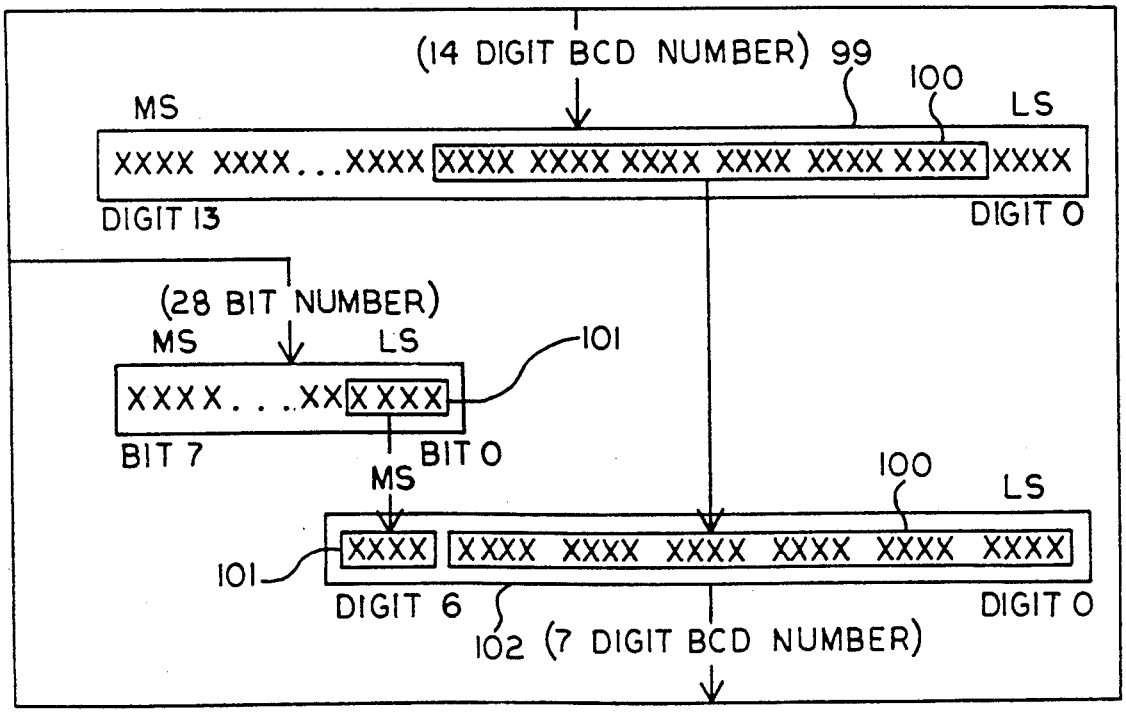

This 14 digit binary coded decimal number 99 is then applied to the format subroutine illustrated in FIG. 9 in which a 6 digit binary coded decimal is obtained by discarding the least significant digit from the 14 digit number 99 and using the next 6 more significant digits. This 6 digit BCD number 100 then has a 7th digit 101 appended as the most significant digit to provide a 7 digit response which is the final result of performing the authentication algorithm.

This final result, when calculated in the personal authentication computer 12 is then communicated back to the host computer for comparison with the analogous final result calculated by the host computer. If they are identical access is permitted and access is refused if they are not.

Although it is preferred that an identity designation be used when the remote user communicates with the host computer so that the host computer may store the secret key in association with the identity designation, it is possible and for some purposes preferable, to eliminate the identity designation. This would have the advantage that an eavesdropper would obtain absolutely no information from eavesdropping upon communication between the remote user and the host computer. For example, he could obtain no information about the traffic of this remote user with an electronic information network. However, in such a system the secret key for a remote user would not be stored in association with the identity designation of that remote user. Therefore, the host computer would need to store in memory all secret keys in a list. Each time an authentication procedure is followed, the host computer would need to perform the authentication algorithm as a function of each of the secret keys in the list to obtain a list of acceptable resulting answers or responses to the performance of the authentication algorithm. After the random number message is transmitted to the remote user and the remote user's response is received by the host computer, the host computer then compares the response to the list of possible responses to determine whether the response from the remote user is in the list and access should be granted.

While certain preferred embodiments of the present invention have been disclosed in detail, it is to be understood that various modifications may be adopted without departing from the spirit of the invention or scope of the following claims.

We claim:

1. In combination a method for authenticating the authority of any of a plurality of remote users to access a host computer, the method comprising:
   (a) storing in the host computer and in each of a plurality of remote user computers the identical selected constant, instructions for using a first, non-invertible algorithm for raising a number to a power using modulo arithmetic, for performing a non-invertible authentication second algorithm which is a function of a secret key and for generating a random number;
   (b) distributing the computers to the remote users;
   (c) initializing the computers independently with the host computer and from a remote location selected by the remote user by:
      (i) establishing communication between the host computer and a remote user computer;
      (ii) independently generating a random first number as a first key in the remote user's computer and in the host computer;
      (iii) independently raising said selected constant in each of the communicating computers to that computer's first key using modulo arithmetic and said first non-invertible algorithm to generate a second key for each computer;
      (iv) communicating the second key of each communicating computer to the other;
      (v) generating and storing in each communicating computer the identical secret key by raising in each computer the second key of the other computer to the power of the computer's own first key using modulo arithmetic by the first non-invertible algorithm; and
      (vi) disconnecting said communication;
   (d) subsequently authenticating the authority of a remote user to access or continue to access the host computer by detecting whether a remote user computer communicating with and seeking access to the host computer has a remote user computer which has been subjected to steps (a), (b) and (c) by:
      (i) generating a second number in the host computer;
      (ii) communicating that second number to the remote user computer;
      (iii) performing said stored, second non-invertible algorithm upon that second number in the remote user computer as a function of its stored secret key and in the host computer as a function of the same secret key;
      (iv) communicating the result of said second algorithm in the remote user computer to the host computer; and
      (v) comparing the transmitted result to the result obtained at the host computer; and
   (e) permitting access to the host computer if the compared portions are identical and preventing access if they are not.

2. A method in accordance with claim 1 using modulo arithmetic for mathematical calculations based on the same modulus in the remote user computer and the host computer.

3. A method in accordance with claim 2 further including the steps of:
   (a) in the initializing steps communicating a remote user identity designation from the remote user to the host computer after communication is established and storing the generated secret key in the host computer in association with that identity designation; and
   (b) in the authenticating steps communicating the identity designation of the remote user to the host computer and then performing the authentication algorithm using only the secret key which is stored in association with that identity designation.

4. A method in accordance with claim 2 wherein, in the authenticating steps, the authenticating algorithm is performed for a plurality of the secret keys stored in the host computer and the result of performing the authentication algorithm in the remote user's computer is compared in sequence, to each of a plurality of results in the host computer and wherein access is permitted if any one of the host computer results is identical to the result from the remote user.

5. A method in accordance with claim 2 or 3 or 4 wherein all inputs to said remote user computer are hand keyed into it by the remote user.

6. A method in accordance with claim 5 wherein, in the initialization step, the communicated public keys are broken into and transmitted in separate alphanumeric portions and the host computer public key is input into the remote user computer in said portions.

7. A method in accordance with claim 6 wherein the public keys are multibit binary numbers which are broken into separate portions by grouping the bits of each public key into groups, each group representing a binary coded digit and dividing the binary coded digits into blocks of associated digits, each block being one of the separate alphanumeric portions which is separately transmitted.

8. A method in accordance with claim 7 wherein the bits are grouped into groups of three bits forming binary coded octal digits and the octal digits are associated in blocks including six such octal digits.

9. A method in accordance with claim 7 wherein, after each said portion is transmitted from the remote user to the host computer, the received portion is transmitted back to the remote user for verification.

10. In combination an apparatus for authenticating the authority of any of a plurality of remote users to access a host computer, the apparatus comprising:
- (a) a plurality of identical, hand-held remote user portable computers which are distributed to the remote users;
- (b) means for storing in the host computer and in each of the plurality of substantially identical portable, remote user computer and identical selected constant, instructions for using a first, non-invertible algorithm for raising a number to a power using modulo arithmetic, for performing a non-invertible authentication second algorithm which is a function of a secret key and for generating a random number;
- (c) means for initializing the portable computers independently with the host computer and from a remote location selected by the remote user by:
  - (i) establishing communication between the host computer and a remote user computer;
  - (ii) independently generating a random first number as a first key in the remote user's computer and in the host computer;
  - (iii) independently raising said selected constant in each of the communicating computers to that computer's first key using modulo arithmetic and said first non-invertible algorithm to generate a second key for each computer;
  - (iv) communicating the second key of each communicating computer to the other;
  - (v) generating and storing in each communicating computer the identical secret key by raising in each computer the second key of the other computer to the power of the computer's own first key using modulo arithmetic by the first non-invertible algorithm; and;
  - (vi) disconnecting said communication;
- (d) means for subsequently authenticating the authority of a remote user to access or continue to access the host computer by detecting whether a remote user communicating with and seeking access to the host computer has a remote user computer which has been subjected to steps (a), (b) and (c) by:
  - (i) generating a second number in the host computer;
  - (ii) communicating that second number to the remote user computer;
  - (iii) performing said stored, second non-invertible algorithm upon that second number in the remote user computer as a function of its stored secret key and in the host computer as a function of the same secret key;
  - (iv) communicating the result of said second algorithm in the remote user computer to the host computer; and
  - (v) comparing the transmitted result to the result obtained at the host computer; and
- (e) means for permitting access to the host computer if the compared portions are identical and preventing access if they are not.

11. A system in accordance with claim 10 further comprising means associated with the host computer and with the authenticating means for computing using modulo arithmetic and for storing the identical modulus in the host computer and in each authenticating means.

12. A system in accordance with claim 11 further comprising means associated with the host computer for breaking down and transmitting computed data groups of the alphanumeric characters representing different portions of the computed data.

* * * * *